United States Patent
Zhang et al.

(10) Patent No.: US 11,070,961 B2
(45) Date of Patent: Jul. 20, 2021

(54) V2X COMMUNICATION METHOD AND APPARATUS

(71) Applicant: Samsung Electronics Co., Ltd, Suwon-si (KR)

(72) Inventors: Shichang Zhang, Beijing (CN); Yi Wang, Beijing (CN); Yingyang Li, Beijing (CN); Jingxing Fu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/763,024

(22) PCT Filed: Aug. 18, 2016

(86) PCT No.: PCT/KR2016/009116
§ 371 (c)(1),
(2) Date: Mar. 23, 2018

(87) PCT Pub. No.: WO2017/052078
PCT Pub. Date: Mar. 30, 2017

(65) Prior Publication Data
US 2019/0058980 A1    Feb. 21, 2019

(30) Foreign Application Priority Data

Sep. 25, 2015  (CN) .......................... 201510624363.7

(51) Int. Cl.
*H04W 4/40*    (2018.01)
*H04W 4/46*    (2018.01)
(Continued)

(52) U.S. Cl.
CPC ................. *H04W 4/40* (2018.02); *H04L 1/00* (2013.01); *H04L 1/0053* (2013.01);
(Continued)

(58) Field of Classification Search
CPC ......... H04W 4/40; H04W 4/02; H04W 8/005; H04W 4/46; Y02D 70/22
(Continued)

(56) References Cited

U.S. PATENT DOCUMENTS 9,961,530 B2    5/2018  Kim et al.
2003/0123396 A1*  7/2003  Seo ..................... H04W 52/286
                                                      370/252
(Continued)

FOREIGN PATENT DOCUMENTS

CN    101282568 A    10/2008
CN    103596238 A     2/2014
(Continued)

OTHER PUBLICATIONS

International Search Report dated Nov. 25, 2016 in connection with International Patent Application No. PCT/KR2016/009116.
(Continued)

*Primary Examiner* — Asad M Nawaz
*Assistant Examiner* — Jason A Harley

(57) ABSTRACT

Embodiments of the present disclosure provide a V2X communication method and apparatus. The method is applicable for a V2X node and includes: detecting a downlink control channel whose CRC code is scrambled by a V-RNTI relevant to the V2X node; and receiving V2X data information on a corresponding downlink data channel according to an indication of the detected downlink control channel. In the present disclosure, the receiving V2X node is able to receive V2X data information selectively, which avoids useless data receiving and data processing operations of the receiving V2X node, reduces the number of downlink control channels and downlink data channels to be detected and processed by the receiving V2X node.

15 Claims, 11 Drawing Sheets

(51) Int. Cl.
*H04W 40/20* (2009.01)
*H04L 12/721* (2013.01)
*H04W 28/02* (2009.01)
*H04L 1/00* (2006.01)
*H04W 28/04* (2009.01)
*H04W 4/06* (2009.01)
*H04W 28/12* (2009.01)
*H04W 72/12* (2009.01)

(52) U.S. Cl.
CPC .............. *H04L 1/0061* (2013.01); *H04W 4/06* (2013.01); *H04W 28/0226* (2013.01); *H04W 28/04* (2013.01); *H04W 28/12* (2013.01); *H04W 72/1273* (2013.01)

(58) Field of Classification Search
USPC ........................................ 455/404.2; 370/330
See application file for complete search history.

(56) References Cited

U.S. PATENT DOCUMENTS

| | | | |
|---|---|---|---|
| 2007/0207727 A1* | 9/2007 | Song | H04L 12/1877 455/3.06 |
| 2010/0015982 A1* | 1/2010 | Wager | H04W 36/0079 455/436 |
| 2010/0135207 A1 | 6/2010 | Qu et al. | |
| 2010/0250346 A1 | 9/2010 | Bai et al. | |
| 2010/0255852 A1* | 10/2010 | Chen | H04W 72/082 455/450 |
| 2012/0184297 A1* | 7/2012 | Kim | H04W 64/00 455/456.1 |
| 2014/0204832 A1* | 7/2014 | Van Phan | H04W 88/10 370/315 |
| 2014/0207338 A1 | 7/2014 | Healey et al. | |
| 2014/0334403 A1* | 11/2014 | Park | H04L 27/2647 370/329 |
| 2015/0023331 A1* | 1/2015 | You | H04L 5/0048 370/336 |
| 2015/0131512 A1* | 5/2015 | Lauer | H04L 67/12 370/312 |
| 2016/0135247 A1* | 5/2016 | Ozturk | H04W 36/0016 455/436 |
| 2016/0142898 A1* | 5/2016 | Poitau | H04W 76/14 370/329 |
| 2016/0165602 A1* | 6/2016 | Suda | H04W 4/08 370/329 |
| 2016/0285935 A1* | 9/2016 | Wu | H04L 65/4076 |
| 2016/0366658 A1 | 12/2016 | Chae | |
| 2017/0019812 A1* | 1/2017 | Lee | H04W 4/44 |
| 2017/0019905 A1 | 1/2017 | Ko et al. | |
| 2017/0367059 A1* | 12/2017 | Park | H04W 76/14 |
| 2018/0124186 A1* | 5/2018 | Zanier | H04L 67/12 |

FOREIGN PATENT DOCUMENTS

| | | |
|---|---|---|
| CN | 104938021 A | 9/2015 |
| EP | 3029651 A1 | 6/2016 |
| WO | 2014/113537 A1 | 7/2014 |
| WO | 2015/016689 A1 | 2/2015 |
| WO | 2015/130033 A1 | 9/2015 |
| WO | 2015/130067 A1 | 9/2015 |
| WO | 2015/142082 A1 | 9/2015 |

OTHER PUBLICATIONS

Written Opinion of the International Searching Authority dated Nov. 25, 2016 in connection with International Patent Application No. PCT/KR2016/009116.
Supplementary European Search Report dated Jun. 12, 2018 in connection with European Patent Application No. 16 84 8804.
Office Action dated May 26, 2020 in connection with Chinese Patent Application No. 201510624363.7, 17 pages.

* cited by examiner

V2X COMMUNICATION METHOD AND APPARATUS

CROSS-REFERENCE TO RELATED APPLICATIONS AND CLAIM OF PRIORITY

This application is a 371 of International Application No. PCT/KR2016/009116 filed Aug. 18, 2016, which claims priority to Chinese Patent Application No. 201510624363.7 filed Sep. 25, 2015, the disclosures of which are herein incorporated by reference in their entirety.

TECHNICAL FIELD

The present disclosure relates to mobile communication techniques, and more particularly, to a V2X communication method and apparatus.

BACKGROUND

At present, Device To Device (D2D) communications technique has been accepted by 3GPP standards due to its huge potential benefits in public security field and common civil communications field, and standardization of some functions has been realized in 3GPP Rel-12 and Rel-13, including: D2D discovery for an in-coverage scenario, D2D broadcast communication for an In-Coverage (IC) scenario, a Partial Coverage (PC) scenario and an Out-of-Coverage (OC) scenario.

Since the D2D communication in the standardization of 3GPP Rel-12 and Rel-13 is mainly focused on low speed terminals and services not sensitive to delay and have low reliability requirement, the already implemented D2D functions are far from meeting the users' requirements. In subsequent releases of 3GPP, communication with low latency and high reliability between high speed devices, between high speed device and low speed device and between high speed device and static device can be realized, i.e., vehicle to vehicle/pedestrian/infrastructure/network (V2X) communication has become a consensus of various communication terminal manufactures at present. Currently, V2X communication project has been accepted by 3GPP and become one of the functions to be standardized preferably.

According to the conclusion of 3GPP RAN#68 meeting, 3GPP will implement V2X communication via two communication schemes: a communication scheme over PC5 interface (a direct communication interface between user devices), and a communication scheme over Uu interface (a communication interface between user device and eNB). The first communication scheme is a distributed communication manner. It mainly improves data transmission reliability and decreases data transmission delay through enhancing existing D2D communication techniques, so as to meet the requirement of the V2X communication. However, the latter communication scheme is a centralized communication manner controlled by the eNB (base station). It supports the V2X communication scenario through enhancing existing cellular communication techniques. In particular, in the V2X communication, a transmitting V2X node (in the present disclosure, vehicle, hand-held terminal and infrastructure which transmit V2X data information are referred to as transmitting V2X node in general) transmits V2X data information to the eNB via an uplink channel. After receiving the V2X data information from the transmitting V2X node, the eNB forwards the V2X data information to receiving V2X nodes. According to the V2X application scenarios proposed by 3GPP, the eNB needs to forward the V2X data information received from the transmitting V2X node to a plurality of receiving V2X nodes, i.e., the eNB needs to implement the forwarding via a broadcast or multicast manner. However, the grouping of users in the multicast manner is realized in the application layer, which is not applicable for the V2X communication scenario. Therefore, the forwarding can only be implemented by the broadcast manner.

In a practical application scenario, one V2X node merely needs to impact and communicate with adjacent V2X nodes within a certain range. However, the broadcast function of the current Long Term Evolution (LTE) cellular network operates towards all users in the cell. Therefore, if the V2X data information is forwarded adopting this broadcast manner, the V2X data information will be forwarded to all V2X nodes in the cell. Thus, for those receiving V2X nodes which do not need to receive the V2X data information, this lead to useless data receiving and data processing operations. For example, in an emergency vehicle arrival reminding application scenario defined by 3GPP, the eNB forwards the reminding information from the emergency vehicle to all V2X nodes in the cell. But in fact, merely those in front of the emergency vehicle and on the same direction with the emergency vehicle need to receive and handle the reminding information, whereas the V2X nodes traveling on the opposite direction do not require the reminding information.

SUMMARY

The technical solution of the present disclosure includes the following:

According to one aspect, a V2X communication method is provided, applicable for a V2X node, the method includes:
  detecting a downlink control channel whose CRC code is scrambled by a V-RNTI relevant to the V2X node; and
  receiving V2X data information on a corresponding downlink data channel according to an indication of the detected downlink control channel.

According to another aspect, a V2X communication method is provided, applicable for a V2X node. The method includes:
  detecting a downlink control channel on time-frequency resources indicated by downlink scheduling information relevant to the V2X node; and
  receiving V2X data information on a corresponding downlink data channel according to an indication of the detected downlink control channel.

According to another aspect, a V2X communication apparatus is provided, applicable for a V2X node. The apparatus includes:
  a detecting module, adapted to detect a downlink control channel whose CRC code is scrambled by a V-RNTI relevant to the V2X node; and
  a receiving module, adapted to receive V2X data information on a corresponding downlink data channel according to an indication of the downlink control channel detected by the detecting module.

According to yet another aspect, a V2X communication apparatus is provided, applicable for a V2X node. The apparatus includes:
  a detecting module, adapted to detect a downlink control channel on time-frequency resources indicated by downlink scheduling information relevant to the V2X node; and
  a receiving module, adapted to receive V2X data information on a corresponding downlink data channel according to an indication of the downlink control channel detected by the detecting module.

In the technical solution provided by the embodiments of the present disclosure, after detecting the downlink control channel whose CRC code is scrambled by the V-RNTI relevant to the receiving V2X node, the receiving V2X node is able to receive the V2X data information on a corresponding downlink data channel according to the indication of the detected downlink control channel. As such, it is possible to selectively receive V2X data information, which avoids useless data receiving and data processing operations of the receiving V2X node, and reduces the number of downlink control channels and downlink data channels need to be detected and processed by the receiving V2X node.

Or, the receiving V2X node merely needs to detect the downlink control channel scheduling the V2X data information transmission on the time-frequency resources indicated by the downlink scheduling information relevant to the receiving V2X node. As such, it is possible to selectively receive V2X data information, which avoids useless data receiving and data processing operations of the receiving V2X node, reduces the number of detections for the downlink control channel by the receiving V2X node, and is favorable for reducing the power consumption of the V2X node.

DETAILED DESCRIPTION

In order to solve the problem of useless data receiving and data processing operations in the related art, embodiments of the present disclosure provide a V2X communication method and an apparatus applicable for performing this method. For facilitating the description, hereinafter, the V2X node transmitting V2X data information is referred to as a transmitting V2X node and the V2X node receiving the V2X data information is referred to as a receiving V2X node. Certainly, a V2X node may act as both a transmitting V2X node and a receiving V2X node.

Figure 1:
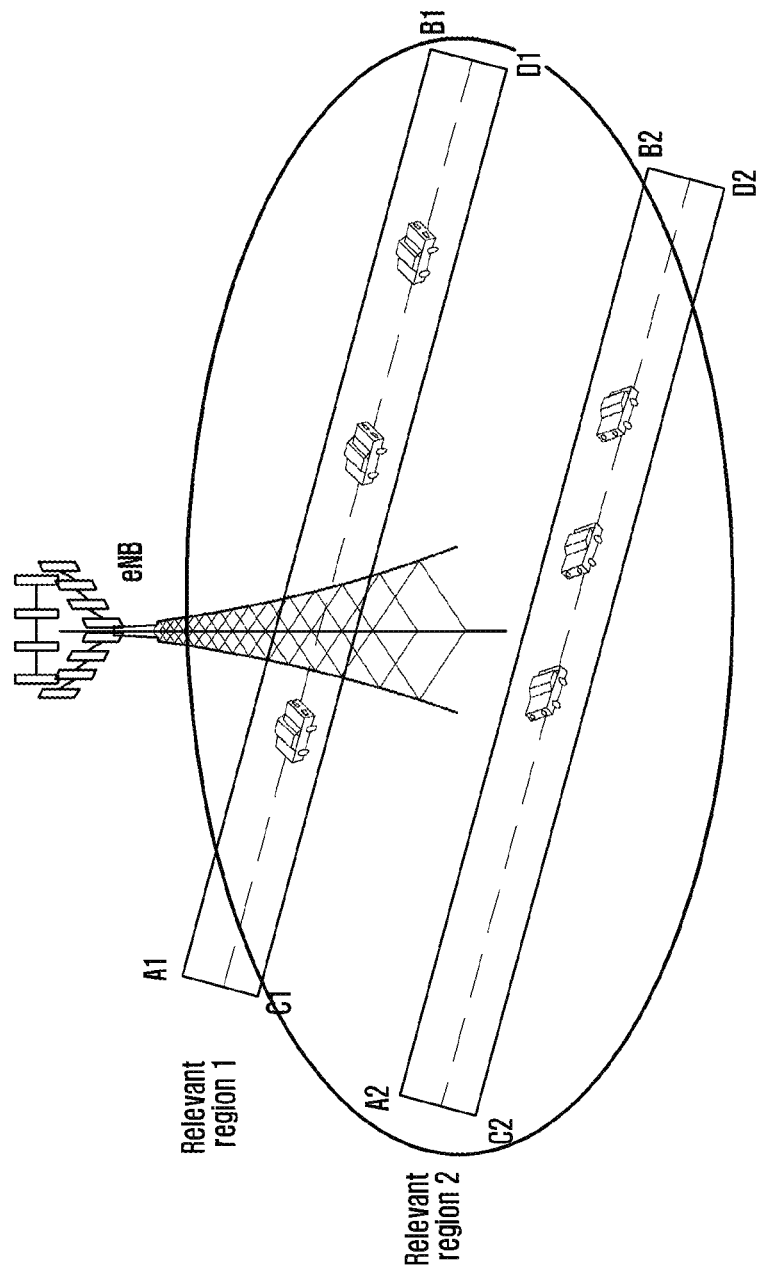
FIG. 1 is a schematic diagram illustrating a relevant region in a cell according to some embodiments of the present disclosure.

In the embodiments of the present disclosure, a cell includes at least a relevant region. The relevant region may be configured according to a practical requirement. For example, as shown in FIG. 1, the cell includes 2 relevant regions: relevant region 1 and relevant region 2.

Hereinafter, the method provided by the embodiments of the present disclosure is described in further detail with reference to the following embodiments 1 to 5.

Embodiment 1

An eNB broadcasts via a system broadcast message a coordinate range, a corresponding Vehicle Radio Network Temporary Identify (V-RNTI), and/or a region Identify (ID) of respective relevant region of the cell. As such, respective V2X node of the cell may save the coordinate range, the corresponding V-RNTI and/or the region ID of respective relevant region. The V-RNTI and/or the region ID of the relevant region are unique in the cell. The coordinate range of the relevant region may be indicated using Global Position System (GPS) coordinates of vertexes of the relevant region. For example, if the relevant region is a rectangle, the coordinate range of the relevant region may be indicated by the coordinates of the four vertexes of the rectangle. As shown in FIG. 1, the coordinate range of the relevant region 1 may be indicated by the coordinates of the vertexes A1, B1, C1 and D1.

The V2X communication method provided by embodiment 1 of the present disclosure includes the following.

Figure 2:
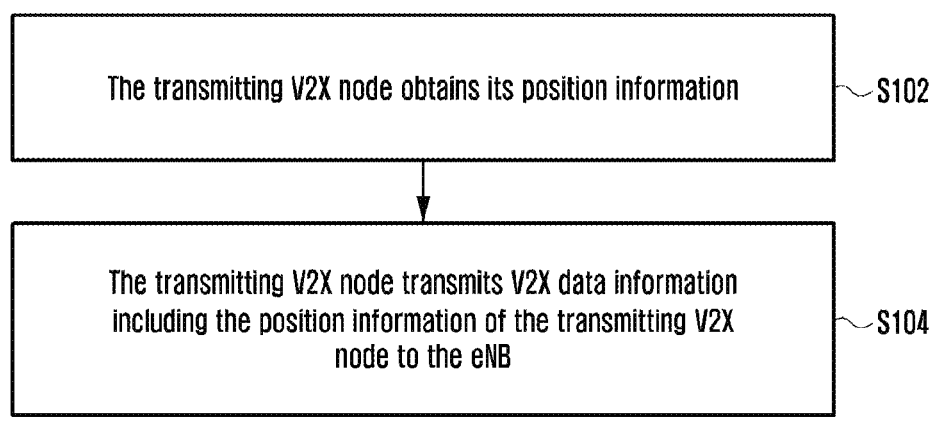
FIG. 2 is a flowchart illustrating a method executed by a transmitting V2X node according to embodiment 1 of the present disclosure.

As shown in FIG. 2, the transmitting V2X node needs to execute the following steps.

In step S102, the transmitting V2X node obtains position information of itself.

The position information may be position coordinates or a region ID of a relevant region where the transmitting V2X node is located. In particular, the method for obtaining the position information of the transmitting V2X node may include: obtaining the position coordinates of the transmitting V2X node, and taking the position coordinates as the position information of the transmitting V2X node; or, obtaining the position coordinates of the transmitting V2X node, determining a coordinate range where the position coordinates belong to according to the coordinate range of respective relevant region, and taking the region ID of the relevant region corresponding to the coordinate range as the position information of the transmitting V2X node. In a practical implementation, the transmitting V2X node may obtain the position information of itself periodically and/or after the occurrence of an event, e.g., in the case of steering or turning around, the transmitting V2X node obtains its position information immediately.

In step S104, the transmitting V2X node transmits V2X data information containing the position information of the transmitting V2X node to the eNB.

The position information of the transmitting V2X node contained in the V2X data information transmitted by the transmitting V2X node is the most recent position information obtained by the transmitting V2X node before the transmitting action.

The eNB determines a relevant region where a receiving V2X node which needs to receive the V2X data information is located according to the position information of the transmitting V2X node contained in the received V2X data information, i.e., determines the relevant region that may be affected by the V2X data information. Then, the eNB scrambles the CRC code of a corresponding downlink control channel using the V-RNTI corresponding to the determined relevant region. The corresponding downlink control channel is used for indicating the downlink data channel carrying the V2X data information.

Figure 3:
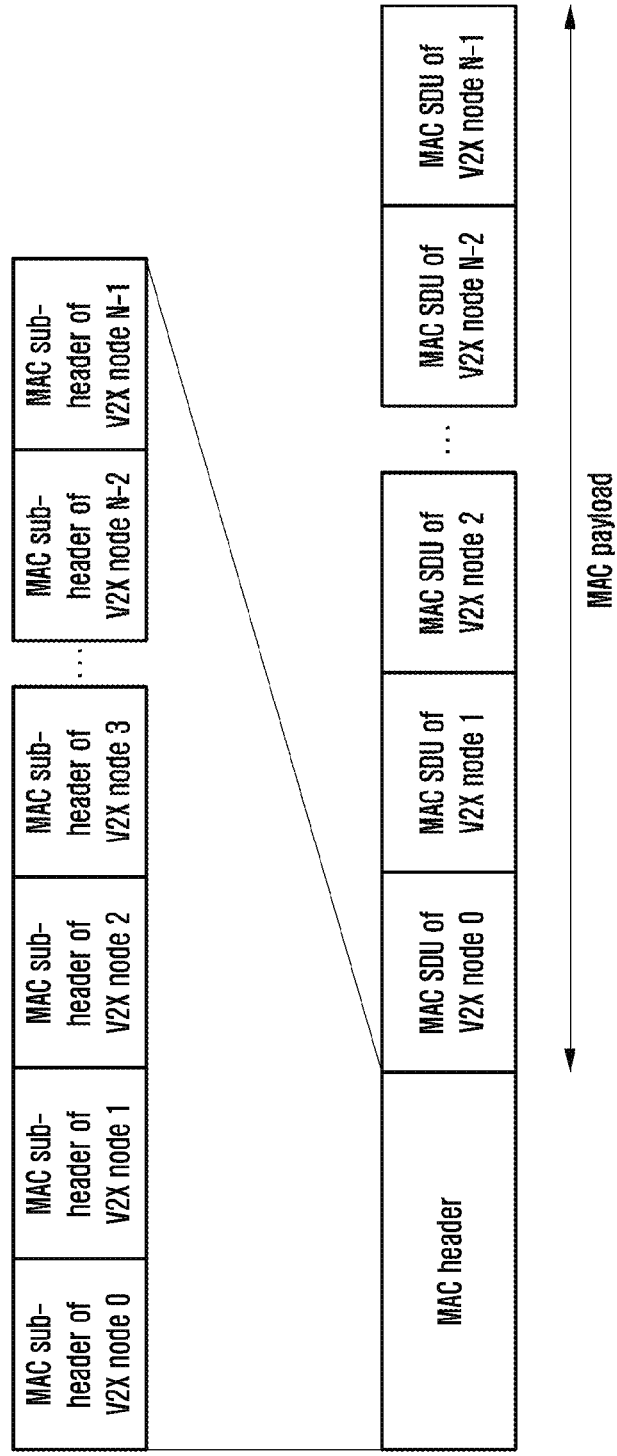
FIG. 3 is a schematic diagram illustrating a structure of a MAC PDU bearing V2X data information of a plurality of V2X nodes according to embodiment 1 of the present disclosure.

One downlink data channel may carry the V2X data information from one transmitting V2X node, or may carry the V2X data information from a plurality of transmitting V2X nodes. In the case that it carries the V2X data information from a plurality of transmitting V2X nodes, preferably, the plurality of V2X data information should affect the same relevant region. If the downlink data channel carries the V2X data information from a plurality of transmitting V2X nodes, the V2X data information of different transmitting V2X nodes may be conveyed by different Media Access Control Service Data Unit (MAC SDU) in the MAC Protocol Data Unit (PDU), as shown in FIG. 3.

Figure 4:
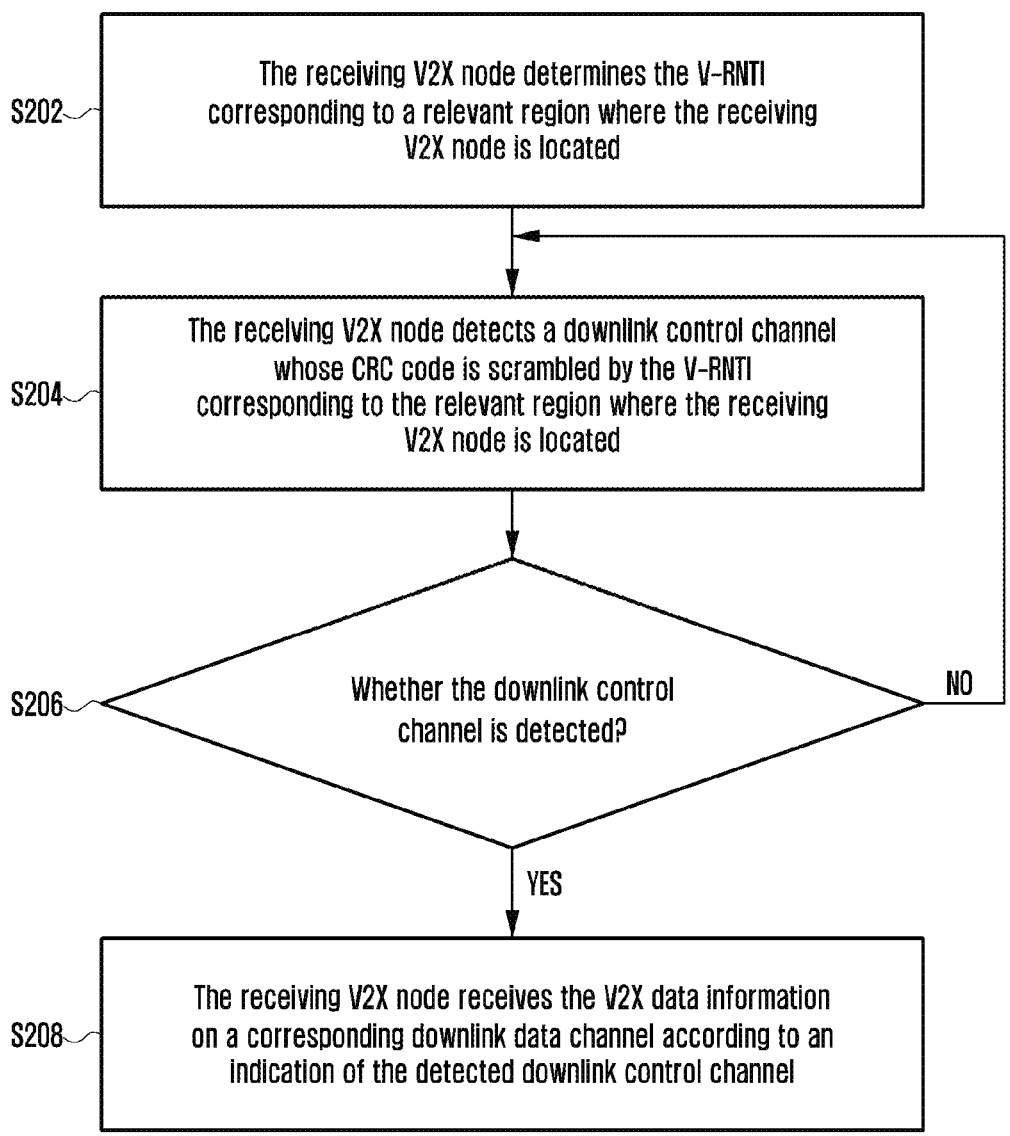
FIG. 4 is a flowchart illustrating a method executed by a receiving V2X node according to embodiment 1 of the present disclosure.

As shown in FIG. 4, the steps executed by the receiving V2X node include the following.

In step S202, the receiving V2X node determines a V-RNTI corresponding to a relevant region where the receiving V2X node is located.

The receiving V2X node may obtain the position coordinates of itself by a GPS of the receiving V2X node and determine the V-RNTI corresponding to the coordinate range that the position coordinates belong to according to the coordinate range of respective relevant region.

When executing step S202, the receiving V2X node should use the most recently obtained position coordinates of the receiving V2X node to determine the V-RNTI corresponding to the relevant region where the receiving V2X node is located. The receiving V2X node detects a downlink control channel in all downlinks subframes of the cell or some downlink subframes used for V2X data information transmission indicated by the eNB via higher layer signaling.

In step S204, the receiving V2X node detects the downlink control channel whose CRC code is scrambled by the V-RNTI corresponding to the relevant region where the receiving V2X node is located.

In step S206, the receiving V2X node determines whether the downlink control channel is detected. If yes, the method proceeds with step S208; otherwise, the method returns to step S204.

In step S208, the receiving V2X node receives the V2X data information on the corresponding downlink data channel according to the indication of the detected downlink control channel.

Through the method provided by embodiment 1 of the present disclosure, the receiving V2X node is able to determine that it needs to receive the V2X data information on the downlink data channel indicated by the downlink control channel after detecting the downlink control channel whose CRC code is scrambled by the V-RNTI corresponding to the relevant region where the receiving V2X node is located. As such, it is possible to receive V2X data information selectively, which avoids useless data receiving and data processing operations of the receiving V2X node, and reduces the number of downlink control channels and downlink data channels need to be detected and processed by the receiving V2X node. In addition, the method of embodiment 1 does not require the V2X node frequently reporting its position information, which helps to decrease the signaling burden of the cell and reduces the number of V2X nodes in the Radio Resource Control (RRC) connected state in the cell.

Embodiment 2

In embodiment 2, one cell corresponds to one V-RNTI, i.e., all relevant regions in the same cell correspond to the same V-RNTI. The value of the V-RNTI corresponding to the cell may be configured by the eNB or defined by standards.

The V2X communication method provided by embodiment 2 includes the following.

In embodiment 2, the steps to be executed by the transmitting V2X node are as shown in FIG. 2, which are similar as those in embodiment 1.

The eNB determines target position information according to the position information of the transmitting V2X node contained in the received V2X data information, transmits the target position information on the corresponding downlink control channel, and scrambles the CRC code of the corresponding downlink control channel using the V-RNTI of the cell, wherein the corresponding downlink control channel is used for indicating the downlink data channel carrying the V2X data information. The target position information may be particular position coordinates or a region ID of a particular relevant region. In a practical implementation, if the target position information is particular position coordinates, the position coordinates may be coordinate values of 64-bit length, or may be compressed coordinate values, e.g., coordinate values of 16-bit length compressed from 64 bits.

Figure 5:
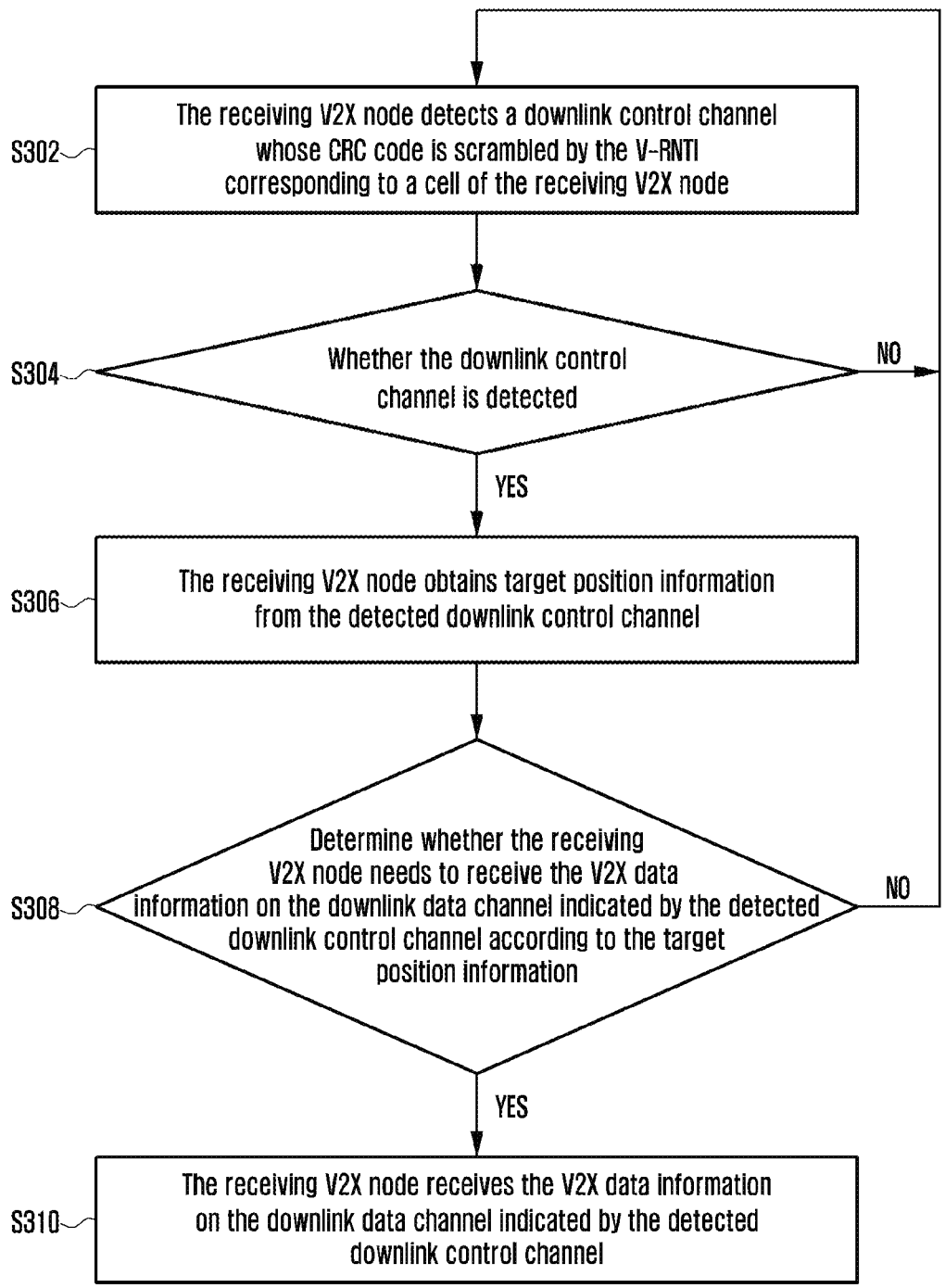
FIG. 5 is a flowchart illustrating a method executed by a receiving V2X node according to embodiment 2 of the present disclosure.

As shown in FIG. 5, the steps to be executed by the receiving V2X node include the following.

In step S302, the receiving V2X node detects the downlink control channel whose CRC code is scrambled by the V-RNTI corresponding to the cell of the receiving V2X node.

In step S304, the receiving V2X node determines whether the downlink control channel is detected. If yes, the method proceeds with step S306; otherwise, the method returns to step S302.

In step S306, the receiving V2X node obtains the target position information from the detected downlink control channel.

In step S308, the receiving V2X node determines whether it needs to receive the V2X data information on the downlink data channel indicated by the detected downlink control channel according to the obtained target position information. If yes, the method proceeds with step S310; otherwise, the method returns to step S302.

In particular, in step S308, the method for determining whether the receiving V2X node needs to receive the V2X data information on the downlink data channel indicated by the detected downlink control channel may include the following three situations:

In a first situation, if the target position information is the position coordinates, determining whether a distance between the position coordinates of the receiving V2X node and the target position information is smaller than a defined distance. If yes, determining that the receiving V2X node needs to receive the V2X data information on the downlink data channel indicated by the detected downlink control channel; otherwise, determining that the receiving V2X node does not need to receive the V2X data information on the downlink data channel indicated by the detected downlink control channel.

In a second situation, if the target position information is a region ID, determining whether the target position information is the same with the region ID of the relevant region where the receiving V2X node is located. If yes, determining that the receiving V2X node needs to receive the V2X data information on the downlink data channel indicated by the detected downlink control channel; otherwise, determining that the receiving V2X node does not need to receive the V2X data information on the downlink data channel indicated by the detected downlink control channel.

In the second situation, the eNB needs to broadcast the coordinate range and the region ID of the relevant region via a system broadcast message.

In a third situation, if the target position information is a region ID, determining whether a distance between the position coordinates of the receiving V2X node and central position coordinates of a coordinate range of a relevant region corresponding to the target position information is smaller than a defined distance, if yes, determining that the receiving V2X node needs to receive the V2X data information on the downlink data channel indicated by the detected downlink control channel; otherwise, determining that the receiving V2X node does not need to receive the V2X data information on the downlink data channel indicated by the detected downlink control channel.

In the third situation, the eNB needs to broadcast the coordinate range and the region ID of the relevant region via a system broadcast message. As such, the receiving V2X node is able to determine the coordinate range of the relevant region corresponding to the target position information, so as to calculate the central position coordinates of the coordinate range.

The value of the above defined distance may be configured according to a practical requirement, which is not restricted in the embodiments of the present disclosure.

In step S310, the receiving V2X node receives the V2X data information on the downlink data channel indicated by the detected downlink control channel.

Through the method provided by embodiment 2 of the present disclosure, after detecting a downlink control channel whose CRC code is scrambled by the V-RNTI corresponding to the cell where the receiving V2X node is located, the receiving V2X node is able to obtain the target position information from the detected downlink control channel and determine whether it needs to receive the V2X data information on the downlink data channel indicated by the downlink control channel according to the target position information. As such, it is possible to receive V2X data information selectively, which avoids useless data receiving and data processing operations of the receiving V2X node, and reduces the number of downlink control channels and downlink data channels need to be detected and processed by the receiving V2X node. In addition, this method is able to reduce the amount of information to be configured by the eNB via system broadcast, and does not require the V2X node frequently reporting its position information, which helps to decrease the signaling burden of the cell and reduces the number of V2X nodes in the RRC connected state in the cell.

Embodiment 3

In embodiment 3, the receiving V2X node reports the position coordinates of itself to the eNB periodically or in response to being triggered by an event. The receiving V2X node receives the corresponding V-RNTI configured by the eNB. Then, the receiving V2X node detects the downlink control channel whose CRC code is scrambled by the V-RNTI corresponding to the receiving V2X node, and receives the V2X data information on the corresponding downlink data channel according to an indication of the detected downlink control channel.

The V2X communication method provided by embodiment 3 includes the following.

The steps to be executed by the transmitting V2X node are as shown in FIG. 2, which are similar to those in embodiment 1.

The eNB determines the receiving V2X node which needs to receive the V2X data information according to the position coordinates of the transmitting V2X node included in the received V2X data information and the position coordinates reported by each receiving V2X node, and scrambles the CRC code of the corresponding downlink control channel using the V-RNTI corresponding to the receiving V2X node which needs to receive the V2X data information. The corresponding downlink control channel is used for indicating the downlink data channel carrying the V2X data information.

Figure 6:
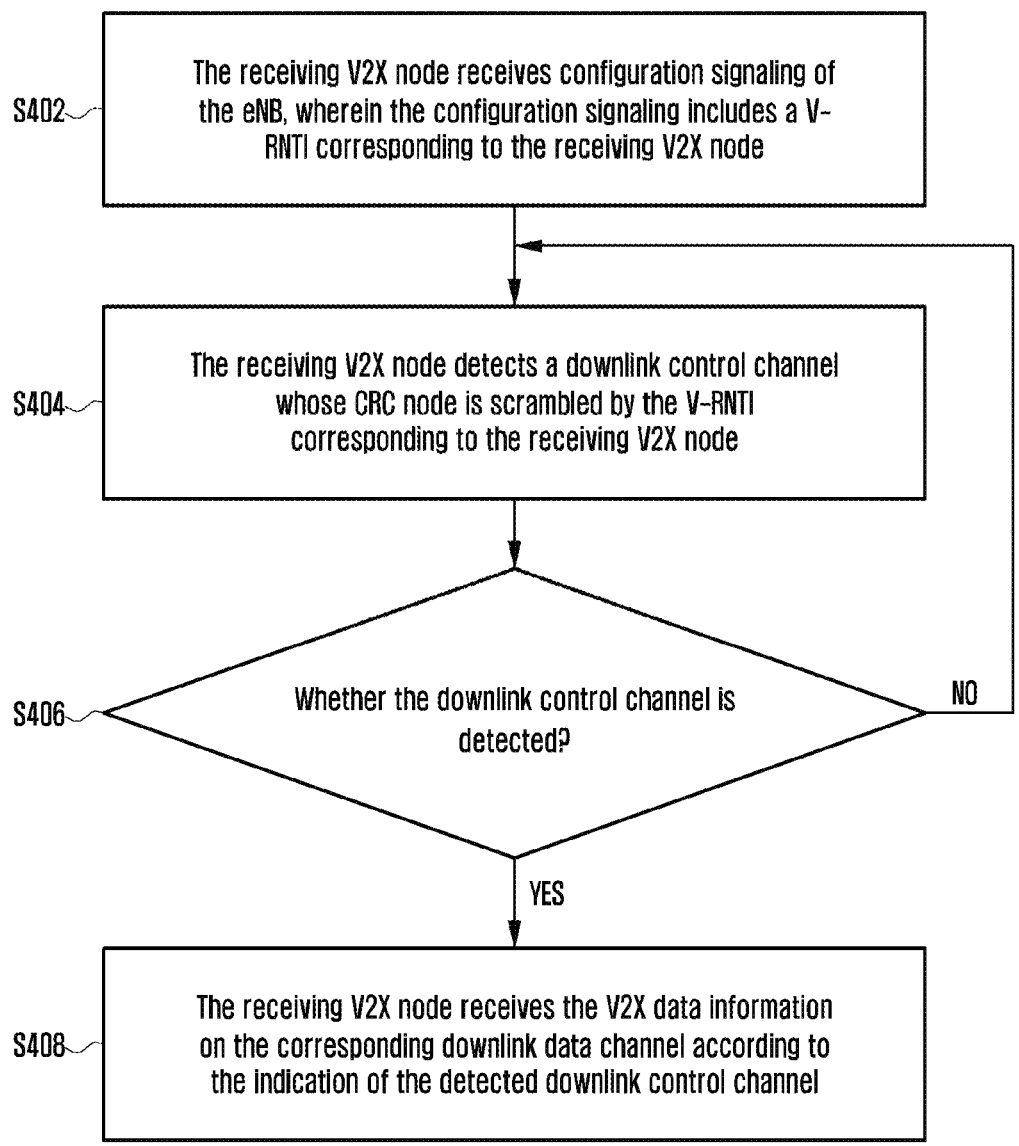
FIG. 6 is a flowchart illustrating a method executed by a receiving V2X node according to embodiment 3 of the present disclosure.

As shown in FIG. 6, the receiving V2X node needs to execute the following steps:

In step S402, the receiving V2X node receives a configuration signaling transmitted by the eNB, wherein the configuration signaling includes the V-RNTI corresponding to the receiving V2X node.

In order to assist the eNB to configure the corresponding V-RNTI for the receiving V2X node, the receiving V2X node reports the position coordinates of itself to the eNB periodically or in response to the occurrence of a particular event, e.g., in the case of steering or turning around, the receiving V2X node immediately reports its position coordinates to the eNB. The eNB is able to configure corresponding V-RNTI for the receiving V2X node according to the coordinates.

In a practical implementation, the receiving V2X node may determine the periodicity and the event for triggering the report through receiving the configuration signaling of the eNB or through pre-configuration or definition of standards.

In step S404, the receiving V2X node detects the downlink control channel whose CRC code is scrambled by the V-RNTI corresponding to the receiving V2X node.

In step S406, the receiving V2X node determines whether the downlink control channel is detected, if yes, the method proceeds with step S408; otherwise, the method returns to step S404.

In step S408, the receiving V2X node receives the V2X data information on the corresponding downlink data channel according to the indication of the detected downlink control channel.

According to the method provided by embodiment 3 of the present disclosure, the receiving V2X node is able to determine that it needs to receive the V2X data information on the downlink data channel indicated by the downlink control channel after detecting the downlink control channel whose CRC code is scrambled by the V-RNTI corresponding to the receiving V2X node. As such, it is possible to receive V2X data information selectively, which avoids useless data receiving and data processing operations of the receiving V2X node, and reduces the number of downlink control channels and downlink data channels need to be detected and processed by the receiving V2X node. In addition, this method does not require the eNB configuring relevant information for relevant region via system broadcast message, thus can reduce the data amount of system messages.

Embodiment 4

In embodiment 4, the eNB broadcasts via a system broadcast message the coordinate range, corresponding downlink scheduling information and/or region ID of respective relevant region of the cell. As such, the V2X nodes in the cell save the coordinate range, the corresponding downlink scheduling information and/or the region ID of respective relevant region, wherein the downlink scheduling information refers to positions of time-frequency resources of a downlink control channel and a downlink data channel, the downlink control channel is used for indicating the transmission of the V2X data information with respect to the relevant region, the downlink data channel is used for bearing the V2X data information with respect to the relevant region. Then, the receiving V2X node detects the downlink control channel whose CRC code is scrambled by the V-RNTI on the time-frequency resources indicated by the downlink scheduling information corresponding to the relevant region where the receiving V2X node is located, and receiving the V2X data information on the corresponding downlink data channel according to the indication of the detected downlink control channel. In embodiment 4, the V-RNTI may be the V-RNTI corresponding to the relevant region or the V-RNTI corresponding to the cell. The coordinate range of the relevant region may be indicated similarly as in embodiment 1.

The V2X communication method provided by embodiment 4 of the present disclosure includes the following.

The steps need to be executed by the transmitting V2X node are as shown in FIG. 2, which are similar to those of embodiment 1.

The eNB determines the relevant region where the receiving V2X node needs to receive the V2X data information is located according to the position information of the transmitting V2X node included in the received V2X data information, i.e., determining the relevant region that may be affected by the V2X data information. The eNB transmits the downlink data channel carrying the V2X data information and the corresponding downlink control channel on the time-frequency resources indicated by the downlink scheduling information corresponding to the relevant region. The CRC code of the downlink control channel is scrambled by the V-RNTI corresponding to the relevant region or the V-RNTI corresponding to the cell.

Figure 7:
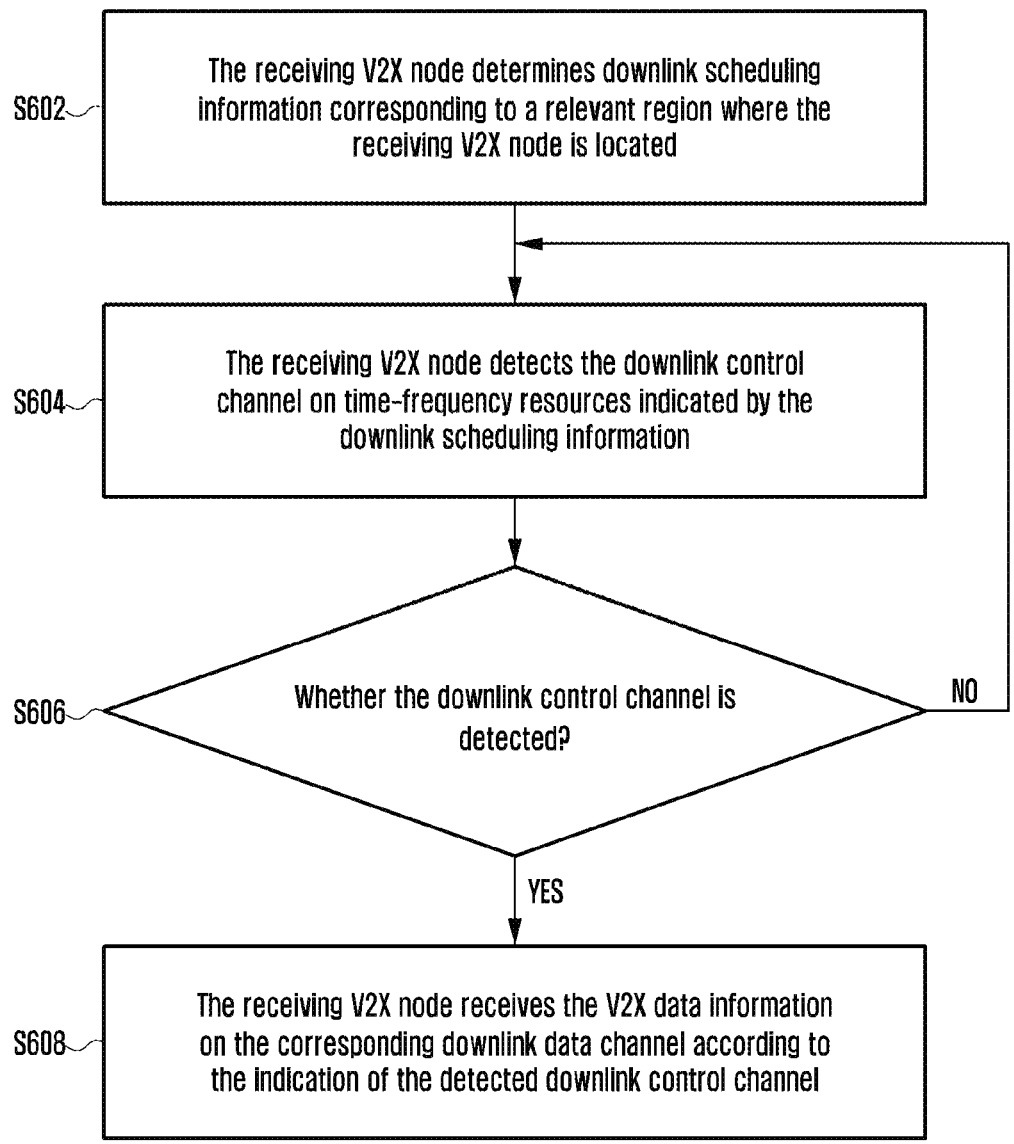
FIG. 7 is a flowchart illustrating a method executed by a receiving V2X node according to embodiment 4 of the present disclosure.

As shown in FIG. 7, the steps need to be executed by the receiving V2X node include the following.

In step S602, the receiving V2X node determines the downlink scheduling information corresponding to the relevant region where the receiving V2X node is located.

The receiving V2X node may obtain the position coordinates of itself through a GPS of the receiving V2X node and determine the downlink scheduling information corresponding to a coordinate range that the position coordinates belong to according to the coordinate range of respective relevant region.

In embodiment 4, the downlink scheduling information may include two kinds of information: periodicity P and offset δ, wherein P and δ are in unit of subframes. In this case, the time-frequency resources of the downlink control channel and the downlink data channel carrying the V2X data information (i.e., the V2X data information that the receiving V2X node in the relevant region needs to receive) of a particular relevant region are: all Resource Elements (REs) which are not occupied by known channels in subframe n, wherein n mode P=δ.

When executing step S602, the receiving V2X node should use the most recently obtained position coordinates of the receiving V2X node to determine the downlink scheduling information corresponding to the relevant region where the receiving V2X node is located.

In step S604, the receiving V2X node detects the downlink control channel on the time-frequency resources indicated by the downlink scheduling information.

In particular, the CRC code of the downlink control channel is scrambled by the V-RNTI corresponding to the relevant region or the V-RNTI corresponding to the cell where the receiving V2X node is located.

In step S606, the receiving V2X node determines whether the downlink control channel is detected, if yes, the method proceeds with step S608; otherwise, the method returns to step S604.

In step S608, the receiving V2X node receives the V2X data information on the corresponding downlink data channel according to the indication of the detected downlink control channel.

Through the method provided by embodiment 4 of the present disclosure, the receiving V2X node merely needs to detect the downlink control channel scheduling the V2X data information transmission on the time-frequency resources indicated by the downlink scheduling information corresponding to the relevant region where the receiving V2X node is located, which reduces the number of detections for the downlink control channel of the receiving V2X node, and helps to decrease the power consumption of the V2X node.

Embodiment 5

In embodiment 5, the receiving V2X node reports the position coordinates of the receiving V2X node to the eNB periodically or in response to being triggered by an event, and receives the corresponding downlink scheduling information configured by the eNB. The downlink scheduling information refers to the positions of the time-frequency resources of the downlink control channel and the downlink data channel, wherein the downlink control channel is used for indicating the transmission of the V2X data information with respect to the receiving V2X node, the downlink data channel is used for bearing the V2X data information with respect to the receiving V2X node. Then, the receiving V2X node detects the downlink control channel whose CRC code is scrambled by the V-RNTI on the time-frequency resources indicated by the downlink scheduling information corresponding to the receiving V2X node, and receives the V2X data information on the downlink data channel according to the indication of the detected downlink control channel. In embodiment 5, the V-RNTI may be the V-RNTI corresponding to the relevant region or the V-RNTI corresponding to the cell.

The V2X communication method provided by embodiment 5 of the present disclosure includes the following.

The steps need to be executed by the transmitting V2X node are as shown in FIG. 2, which are similar to those in embodiment 1.

The eNB determines the receiving V2X node which needs to receive the V2X data information according to the position coordinates of the transmitting V2X node included in the received V2X data information and the position coordinates reported by each receiving V2X node, and transmits the downlink data channel bearing the V2X data information and the corresponding downlink control channel on the time-frequency resources indicated by the downlink scheduling information corresponding to the determined receiving V2X node. The CRC code of the downlink control channel is scrambled by the V-RNTI corresponding to the relevant region where the determined receiving V2X node is located or is scrambled by the V-RNTI corresponding to the cell where the determined receiving V2X node is located.

Figure 8:
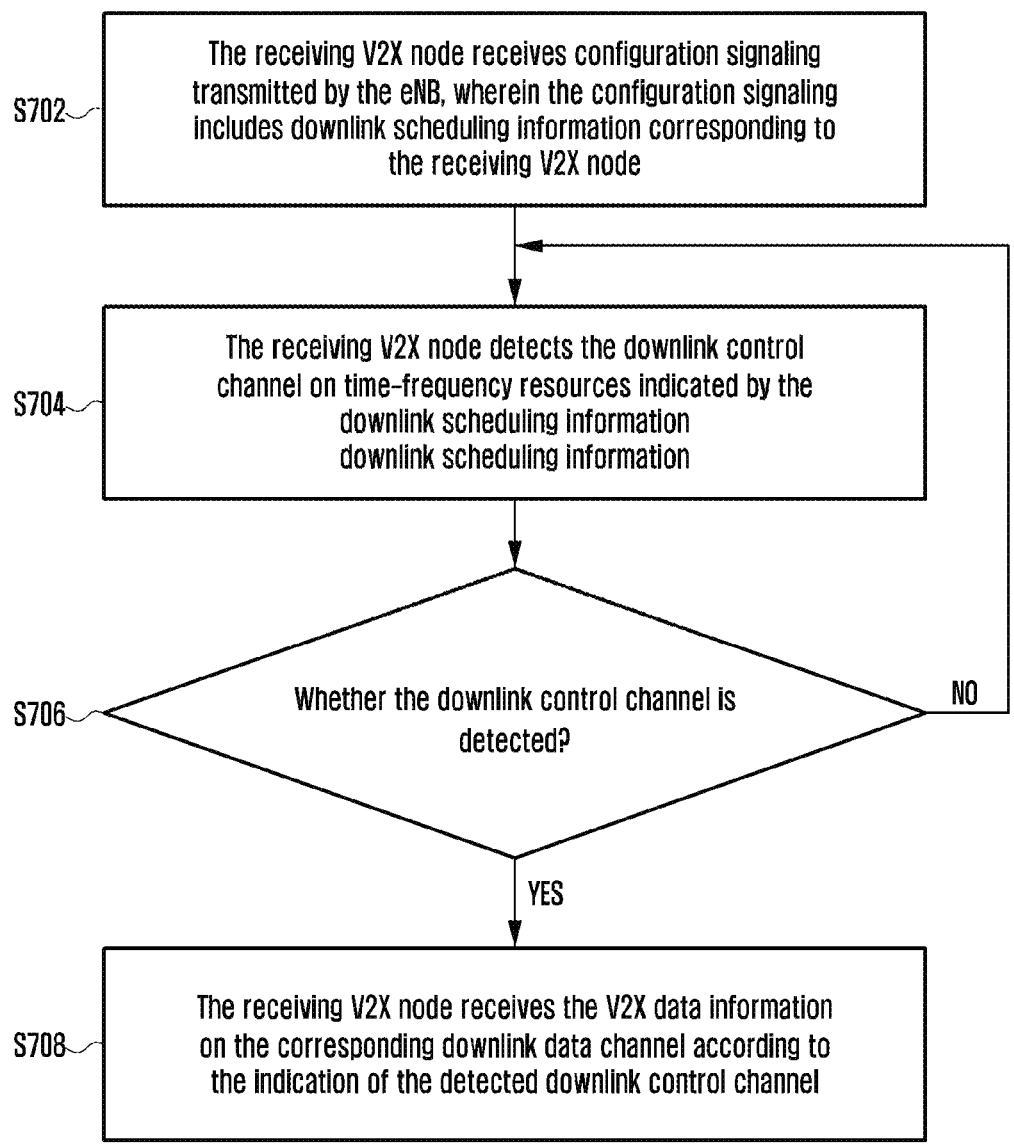
FIG. 8 is a flowchart illustrating a method executed by a receiving V2X node according to embodiment 5 of the present disclosure.

As shown in FIG. 8, the steps need to be executed by the receiving V2X node include the following.

In step S702, the receiving V2X node receives the configuration signaling transmitted by the eNB, wherein the configuration signaling includes: the downlink scheduling information corresponding to the receiving V2X node.

In order to assist the eNB to configure the corresponding downlink scheduling information for the receiving V2X node, the receiving V2X node reports the position coordinates of itself to the eNB periodically or upon the occurrence of a particular event, e.g., in the case of steering or turning around, the receiving V2X node immediately reports its position coordinates to the eNB. The eNB is able to configure corresponding downlink scheduling information for the receiving V2X node according to the coordinates.

In a practical implementation, the receiving V2X node may determine the periodicity and the event for triggering the report through receiving the configuration signaling of the eNB or through pre-configuration or definition of standards.

In embodiment 5, the downlink scheduling information may include two kinds of information: periodicity P and offset δ, wherein P and δ are in unit of subframes. In this case, the time-frequency resources of the downlink control channel and the downlink data channel carrying the V2X data information (i.e., the V2X data information that the receiving V2X node in the relevant information needs to receive) of a particular receiving V2X node are: all REs which are not occupied by known channels in subframe n, wherein n mode P=δ.

In step S704, the receiving V2X node detects the downlink control channel on the time-frequency resources indicated by the downlink scheduling information corresponding to the receiving V2X node.

In particular, the CRC code of the downlink control channel is scrambled by the V-RNTI corresponding to the relevant region where the receiving V2X node is located or the V-RNTI corresponding to the cell where the receiving V2X node is located.

In step S706, the receiving V2X node determines whether the downlink control channel is detected, if yes, the method proceeds with step S708; otherwise, the method returns to step S704.

In step S708, the receiving V2X node receives the V2X data information on the corresponding downlink data channel according to the indication of the detected downlink control channel.

Through the method provided by embodiment 5 of the present disclosure, the receiving V2X node merely needs to detect the downlink control channel scheduling the V2X data information transmission on the time-frequency resources indicated by the downlink scheduling information corresponding to the receiving V2X node, which reduces the number of detections for the downlink control channel of the receiving V2X node, and helps to decrease the power consumption of the V2X node.

In accordance with the above methods provided by the embodiments of the present disclosure, an embodiment of the present disclosure also provides a V2X communication apparatus applicable for performing the method. The apparatus is applicable for a V2X node.

As shown in FIG. 7, the apparatus includes the following modules: a detecting module 501 and a receiving module 502, wherein the detecting module 501 is adapted to detect a downlink control channel whose CRC code is scrambled by a V-RNTI relevant to the V2X node; and the receiving module 502 is adapted to receive the V2X data information on a corresponding downlink data channel according to the indication of the downlink control channel detected by the detecting module 501.

In some embodiments, the V-RNTI relevant to the V2X node may be the V-RNTI corresponding to the relevant region where the V2X node is located, wherein one cell includes at least one relevant region, and the V-RNTI corresponding to each relevant region is obtained via broadcast of the eNB.

In some embodiments, the V-RNTI relevant to the V2X node may be the V-RNTI corresponding to the cell where the V2X node is located. At this time, the receiving module 502 includes: an obtaining unit, a determining unit and an information receiving unit; wherein the obtaining unit is adapted to obtain target position information from the downlink control channel detected by the detecting module 501;

the determining unit is adapted to determine whether the V2X node needs to receive the V2X data information on the downlink data channel indicated by the detected downlink control channel according to the obtained target position information; and the information receiving unit is adapted to receive the V2X data information on the downlink data channel indicated by the detected downlink control channel if the determining unit determines that the V2X node needs to receive the V2X data information on the downlink data channel indicated by the detected downlink control channel.

In some embodiments, the determining unit may be adapted to:

if the target position information is position coordinates, determine whether a distance between the position coordinates of the V2X node and the target position information is smaller than a defined distance, if yes, determine that the V2X node needs to receive the V2X data information on the downlink data channel indicated by the detected downlink control channel; otherwise, determine that the V2X node does not need to receive the V2X data information on the downlink data channel indicated by the detected downlink control channel;

or, if the target position information is a region ID, determine whether the target position information is the same as the region ID of the relevant region where the V2X node is located, if yes, determine that the V2X node needs to receive the V2X data information on the downlink data channel indicated by the detected downlink control channel; otherwise, determine that the V2X node does not need to receive the V2X data information on the downlink data channel indicated by the detected downlink control channel;

or, if the target position information is a region ID, determine whether a distance between the position coordinates of the V2X node and central position coordinates of a coordinate range of a relevant region corresponding to the target position information is smaller than a defined distance, if yes, determine that the V2X node needs to receive the V2X data information on the downlink data channel indicated by the detected downlink control channel; otherwise, determine that the V2X node does not need to receive the V2X data information on the downlink data channel indicated by the detected downlink control channel; wherein the region ID and the coordinate range of each relevant range are obtained via broadcast of the eNB.

In some embodiments, the V-RNTI relevant to the V2X node is the V-RNTI corresponding to the V2X node. At this time, as shown in FIG. 8, the apparatus may further include: a reporting module 503, wherein the reporting module 503 is adapted to report the obtained position coordinates of the V2X node to the eNB; and the receiving module 502 is further adapted to receive configuration signaling carrying the V-RNTI corresponding to the V2X node transmitted by the eNB, wherein the V-RNTI corresponding to the V2X node is configured by the eNB according to the position coordinates of the V2X node.

Figure 9:
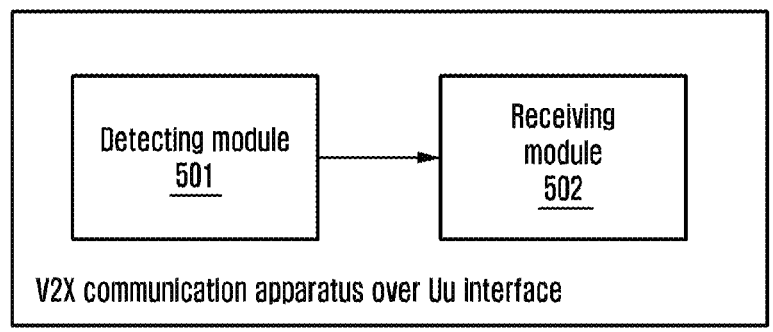
FIG. 9 is a schematic diagram illustrating a structure of a V2X communication apparatus according to some embodiments of the present disclosure.

In addition, as shown in FIG. 9, the apparatus may further include: a position information obtaining module 504 and a transmitting module 505; wherein the position information obtaining module 504 is adapted to obtain the position information of the V2X node; and the transmitting module 505 is adapted to transmit V2X data information carrying the position information of the V2X node obtained by the position information obtaining module 504 to the eNB.

In some embodiments, the position information obtaining module 504 is adapted to:

obtain the position coordinates of the V2X node, and take the position coordinates as the position information of the V2X node;

or, obtain the position coordinates of the V2X node, determine a coordinate range that the position coordinates belong to according to the coordinate range of respective relevant range, and take a region ID of the relevant region corresponding to the coordinate range as the position information of the V2X node; wherein the cell includes at least one relevant region, the coordinate range and the region ID of each relevant region are obtained via broadcast of the eNB.

In some embodiments, if the V-RNTI relevant to the V2X node is the V-RNTI corresponding to the relevant region where the V2X node is located, the relevant region where the V2X node is located is determined by the eNB according to the position information included in the V2X data information conveyed by the corresponding downlink data channel; wherein one cell includes at least one region;

if the V-RNTI relevant to the V2X node is the V-RNTI corresponding to the cell, the target position information included in the detected downlink control channel is determined by the eNB according to the position information included in the V2X data information conveyed by the corresponding downlink data channel;

if the V-RNTI relevant to the V2X node is the V-RNTI corresponding to the V2X node, the V2X node is determined by the eNB according to the position information included in the V2X data information conveyed by the corresponding downlink data channel.

In addition, an embodiment of the present disclosure provides a V2X communication apparatus, applicable to a V2X node.

As shown in FIG. 9, the apparatus includes: a detecting module 501 and a receiving module 502; wherein the detecting module 501 is adapted to detect a downlink control channel on time-frequency resources indicated by downlink scheduling information relevant to the V2X node; and the receiving module 502 is adapted to receive V2X data information on a corresponding downlink data channel according to the indication of the downlink control channel detected by the detecting module 501.

In some embodiments, the downlink scheduling information relevant to the V2X node is downlink scheduling information corresponding to a relevant region where the V2X node is located, wherein one cell includes at least one relevant region, and the V-RNTI corresponding to each relevant region is obtained via broadcast of the eNB.

Figure 10:
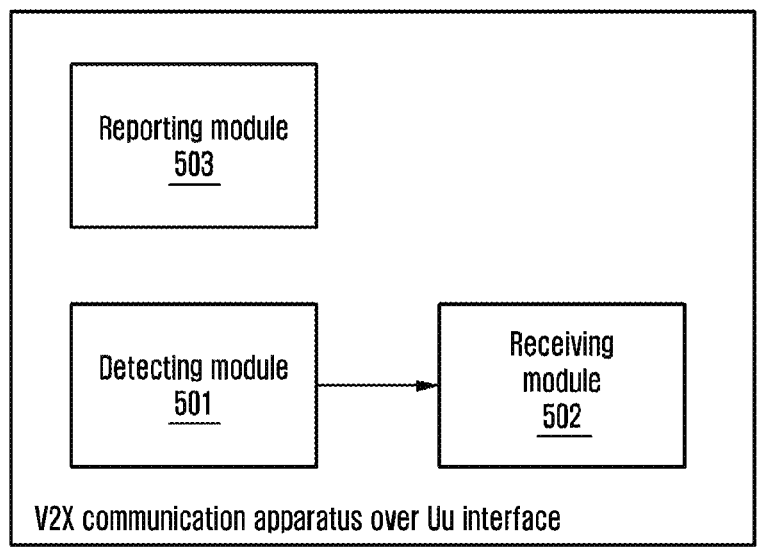
FIG. 10 is a schematic diagram illustrating another structure of the V2X communication apparatus according to some embodiments of the present disclosure.

In some embodiments, the downlink scheduling information relevant to the V2X node is the downlink scheduling information corresponding to the V2X node, as shown in FIG. 10, the apparatus may further include: a reporting module 503; wherein the reporting module 503 is adapted to report the position coordinates of the V2X node to the eNB; and the receiving module 502 is further adapted to receive configuration signaling carrying the downlink scheduling information corresponding to the V2X node transmitted by the eNB, wherein the downlink scheduling information corresponding to the V2X node is configured by the eNB according to the position coordinates of the V2X node.

Figure 11:
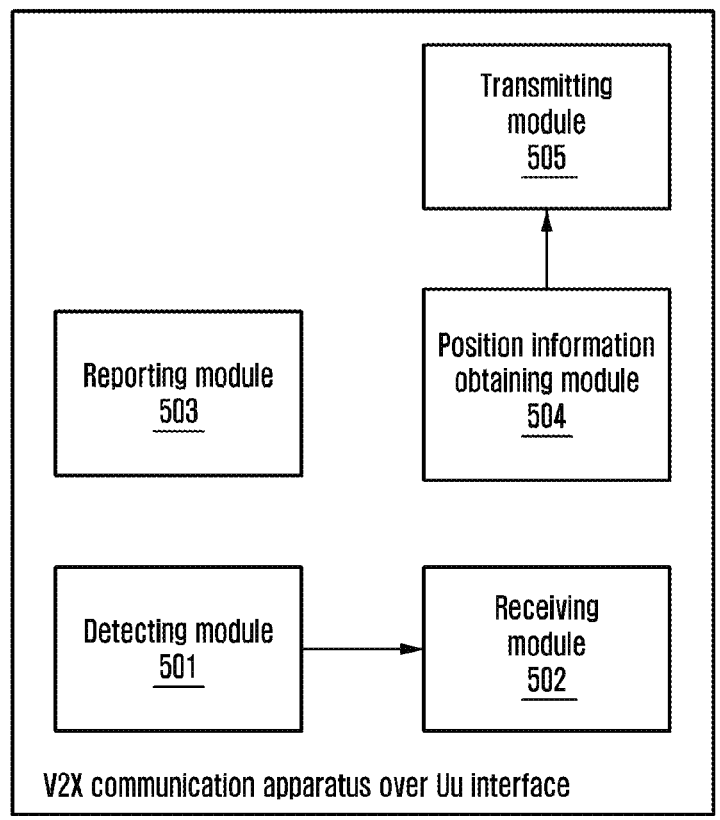
FIG. 11 is a schematic diagram illustrating still another structure of the V2X communication apparatus according to some embodiments of the present disclosure.

In addition, as shown in FIG. 11, the apparatus may further include: a position information obtaining module 504 and a transmitting module 505; wherein the position information obtaining module 504 is adapted to obtain the position information of the V2X node; and the transmitting module 505 is adapted to transmit the V2X data information carrying the position information of the V2X node obtained by the position information obtaining module 504 to the eNB.

In some embodiments, the position information obtaining module 504 is adapted to: obtain the position coordinates of the V2X node, take the position coordinates as the position information of the V2X node; or, obtain the position coordinates of the V2X node, determine coordinate range that the position coordinates belong to according to the coordinate range of each relevant region, and take a region ID of the relevant region corresponding to the coordinate range as the position information of the V2X node; wherein one cell includes at least one relevant region, and the coordinate range and the region ID of each relevant region are obtained via broadcast of the eNB.

In some embodiments, if the downlink scheduling information relevant to the V2X node is the downlink scheduling information corresponding to the relevant region where the V2X node is located, the relevant region where the V2X node is located is determined by the eNB according to the position information included in the V2X data information conveyed by the corresponding downlink data channel; wherein one cell includes at least one relevant region;

if the downlink scheduling information relevant to the V2X node is the downlink scheduling information corresponding to the V2X node, the V2X node is determined by the eNB according to the position information included in the V2X data information conveyed by the corresponding downlink data channel.

In view of the above, the embodiments of the present disclosure may achieve the following technical effects:

(1) Through the method provided by embodiment 1 of the present disclosure, after detecting the downlink control channel whose CRC code is scrambled by the V-RNTI corresponding to the relevant region where the receiving V2X node is located, the receiving V2X node is able to determine whether it needs to receive the V2X data information of the downlink data channel indicated by the downlink control channel. As such, it is possible to receive V2X data information selectively, which avoids useless data receiving and data processing operations of the receiving V2X node, and reduces the number of downlink control channels and downlink data channels need to be detected and processed by the receiving V2X node. In addition, this method does not require the receiving V2X node frequently reporting its position information, which helps to reduce signaling burden of the cell and reduce the number of V2X nodes in the Radio Resource Control (RRC) connected state in the cell.

(2) According to the method provided by embodiment 2 of the present disclosure, after detecting the downlink control channel whose CRC code is scrambled by the V-RNTI corresponding to the cell where the receiving V2X node is located, the receiving V2X node is able to obtain target position information from the detected downlink control channel and determine whether it needs to receive the V2X data information on the downlink data channel indicated by the downlink control channel according to the target position information. As such, it is possible to receive V2X data information selectively, which avoids useless data receiving and data processing operations of the receiving V2X node, and reduces the number of downlink control channels and downlink data channels need to be detected and processed by the receiving V2X node. In addition, this method is able to reduce the amount of information needs to be configured by the eNB via system broadcast, and the V2X node does not need to frequently report its position information, which reduces signaling burden of the cell and reduces the number of V2X nodes in the RRC connected state in the cell.

(3) According to the method provided by embodiment 3 of the present disclosure, after detecting the downlink control channel whose CRC code is scrambled by the V-RNTI corresponding to the receiving V2X node, the receiving V2X node is able to determine whether it needs to receive the V2X data information on the downlink data channel indicated by the downlink control channel. As such, it is possible to receive V2X data information selectively, which avoids useless data receiving and data processing operations of the receiving V2X node, and reduces the number of downlink control channels and downlink data channels need to be detected and processed by the receiving V2X node. In addition, this method does not require the eNB configuring the relevant information for the relevant region via system broadcast message, therefore the data amount of the system information is reduced.

(4) According to the method provided by embodiment 4 of the present disclosure, the receiving V2X node merely needs to detect the downlink control channel scheduling the V2X data information transmission on the time-frequency resources indicated by the downlink scheduling information corresponding to the relevant region where the receiving V2X node is located, which reduces the number of detections for the downlink control channel of the receiving V2X node and is favorable for reducing the power consumption of the V2X node.

(5) According to the method provided by embodiment 5 of the present disclosure, the receiving V2X node merely needs to detect the downlink control channel scheduling the V2X data information transmission on the time-frequency resources indicated by the downlink scheduling information corresponding to the receiving V2X node, which reduces the number of detections for the downlink control channel of the receiving V2X node and is favorable for reducing the power consumption of the V2X node.

The foregoing descriptions are only preferred embodiments of this disclosure and are not for use in limiting the protection scope thereof. Any changes and modifications can be made by those skilled in the art without departing from the spirit of this disclosure and therefore should be covered within the protection scope as set by the appended claims.

The invention claimed is:

1. A vehicle to at least one of vehicle, pedestrian, infrastructure or network (V2X) communication method, applicable for a receiving V2X node, the method comprising:
    determining a vehicle radio network temporary identify (V-RNTI) based on a relevant region, where the receiving V2X node is located, among one or more relevant regions, wherein a cell corresponds to the one or more relevant regions, and wherein at least one of the one or more relevant regions is determined by a coordinate range;
    detecting a downlink control channel associated with cyclic redundancy check (CRC) code is scrambled by the V-RNTI relevant to the receiving V2X node;
    obtaining target position information corresponding to a position of a transmitting V2X node, which transmitted V2X data information to a base station, from the detected downlink control channel;
    determining whether to receive the V2X data information, from the base station to the receiving V2X node on a downlink data channel indicated by the detected downlink control channel based on a position of the receiving V2X node and obtained target position information corresponding to the position of the transmitting V2X node; and
    receiving the V2X data information on the downlink data channel based on an indication of the detected downlink control channel, and the determination to receive the V2X data information.

2. The method of claim 1, wherein the V-RNTI corresponding to the relevant region is obtained via broadcast of the base station.

3. The method of claim 1,
    wherein determining whether to receive the V2X data information on the downlink data channel indicated by the detected downlink control channel based on the obtained target position information comprises:
        in a case that the target position information is position coordinates, determining that a distance between position coordinates of the receiving V2X node and the target position information is smaller than a defined distance, and determining to receive the V2X data information on the downlink data channel indicated by the detected downlink control channel;
        or, in a case that the target position information is a region ID, determining that the target position information is the same as a region ID of the relevant region where the receiving V2X node is located, and determining to receive the V2X data information on the downlink data channel indicated by the detected downlink control channel, wherein the region ID of the relevant region is obtained via broadcast of the base station;
        or, the target position information is a region ID, determining that a distance between position coordinates of the receiving V2X node and central position coordinates of a coordinate range of a relevant region corresponding to the target position information is smaller than a defined distance, and determining to receive the V2X data information on the downlink data channel indicated by the detected downlink control channel, wherein the region ID and the coordinate range of the relevant region are obtained via broadcast of the base station.

4. The method of claim 1, further comprising:
reporting obtained position coordinates of the receiving V2X node to the base station; and
receiving configuration signaling including the V-RNTI corresponding to the receiving V2X node transmitted by the base station, wherein the V-RNTI corresponding to the receiving V2X node is configured by the base station based on the obtained position coordinates of the receiving V2X node.

5. The method of claim 1, further comprising:
obtaining position information of the receiving V2X node; and
transmitting V2X data information including the position information of the receiving V2X node to the base station,
wherein the obtaining the position information of the receiving V2X node comprises:
obtaining position coordinates of the receiving V2X node, and configuring the position coordinates as the position information of the receiving V2X node;
or, obtaining position coordinates of the receiving V2X node, and determining the coordinate range that the position coordinates belong to based on a coordinate range of each of the one or more relevant regions, and configuring a region ID of the relevant region corresponding to the coordinate range as the position information of the receiving V2X node, wherein the coordinate range and the region ID are obtained via broadcast of the base station.

6. The method of claim 5, wherein
the relevant region where the receiving V2X node is located is determined by the base station based on the position information included in the V2X data information on the downlink data channel.

7. A vehicle to at least one of vehicle, pedestrian, infrastructure or network (V2X) communication method, applicable for a receiving V2X node, the method comprising:
obtaining downlink scheduling information based on a relevant region where the receiving V2X node is located, wherein a cell corresponds to one or more relevant regions, and wherein at least one of the one or more relevant regions is determined by a coordinate range;
detecting a downlink control channel on time-frequency resources indicated by the downlink scheduling information relevant to the receiving V2X node;
obtaining target position information corresponding to a position of a transmitting V2X node, which transmitted V2X data information to a base station, from the detected downlink control channel;
determining whether to receive the V2X data information, from the base station to the receiving V2X node on a downlink data channel indicated by the detected downlink control channel based on a position of the receiving V2X node and obtained target position information corresponding to the position of the transmitting V2X node; and
receiving the V2X data information on the downlink data channel based on an indication of the detected downlink control channel, and the determination to receive the V2X data information.

8. The method of claim 7, wherein the downlink scheduling information corresponding to the relevant region is obtained via broadcast of the base station.

9. The method of claim 7, further comprising:
reporting position coordinates of the receiving V2X node to the base station; and
receiving configuration signaling including the downlink scheduling information corresponding to the receiving V2X node transmitted by the base station, wherein the downlink scheduling information corresponding to the receiving V2X node is configured by the base station based on the position coordinates of the receiving V2X node.

10. The method of claim 7, further comprising:
obtaining position information of the receiving V2X node; and
transmitting V2X data information including the position information of the receiving V2X node to the base station,
wherein obtaining the position information of the receiving V2X node comprises:
obtaining position coordinates of the receiving V2X node, and configuring the position coordinates as the position information of the receiving V2X node;
or, obtaining position coordinates of the receiving V2X node, and determining the coordinate range that the position coordinates belong to based on a coordinate range of each of the one or more relevant regions, and configuring a region ID of the relevant region corresponding to the coordinate range as the position information of the receiving V2X node, wherein the coordinate range and the region ID are obtained via broadcast of the base station,
wherein the relevant region where the receiving V2X node is located is determined by the base station based on the position information included in the V2X data information on the downlink data channel.

11. A vehicle to at least one of vehicle, pedestrian, infrastructure or network (V2X) communication apparatus, applicable for a receiving V2X node, the apparatus comprising:
a transceiver; and
at least one processor coupled with the transceiver and configured to:
determine a vehicle radio network temporary identify (V-RNTI) based on a relevant region, where the receiving V2X node is located, among one or more relevant regions, wherein a cell corresponds to the one or more relevant regions, and wherein at least one of the one or more relevant regions is determined by a coordinate range,
detect a downlink control channel associated with Cyclic Redundancy Check (CRC) code is scrambled by the V-RNTI relevant to the receiving V2X node,
obtain target position information corresponding to a position of a transmitting V2X node, which transmitted V2X data information to a base station, from the detected downlink control channel,
determine whether to receive the V2X data information, from the base station to the receiving V2X node, on a downlink data channel indicated by the detected downlink control channel based on a position of the receiving V2X node and obtained target position information corresponding to the position of the transmitting V2X node, and receive the V2X data information, from a base station, on the downlink data channel based on an indication of the detected downlink control channel, and the determination to receive the V2X data information.

12. The apparatus of claim 11, wherein the V-RNTI corresponding to the relevant region is obtained via broadcast of the base station, and wherein the at least one processor is further configured to:

in a case that the target position information is position coordinates, determine that a distance between position coordinates of the receiving V2X node and the target position information is smaller than a defined distance, and determine to receive the V2X data information on the downlink data channel indicated by the detected downlink control channel;

or, in a case that the target position information is a region ID, determine that the target position information is the same as a region ID of the relevant region where the receiving V2X node is located, and determine to receive the V2X data information on the downlink data channel indicated by the detected downlink control channel;

or, the target position information is a region ID, determine that a distance between position coordinates of the receiving V2X node and central position coordinates of a coordinate range of a relevant region corresponding to the target position information is smaller than a defined distance, and determine to receive the V2X data information on the downlink data channel indicated by the detected downlink control channel, wherein the region ID and the coordinate range of the relevant region are obtained via broadcast of the base station.

13. The apparatus of claim 12, wherein the at least one processor is further configured to:

obtain position coordinates of the receiving V2X node, and configure the position coordinates as position information of the receiving V2X node;

or, obtain position coordinates of the receiving V2X node, and determine the coordinate range that the position coordinates belong to based on a coordinate range of each of the one or more relevant regions, and configure a region ID of the relevant region corresponding to the coordinate range as the position information of the receiving V2X node, wherein the coordinate range and the region ID are obtained via broadcast of the base station, and transmit V2X data information including the configured position information of the receiving V2X node to the base station, wherein the relevant region where the receiving V2X node is located is determined by the base station based on the position information included in the V2X data information on the downlink data channel.

14. A vehicle to at least one of vehicle, pedestrian, infrastructure or network (V2X) communication apparatus, applicable for a receiving V2X node, the apparatus comprising:

a transceiver; and at least one processor coupled with the transceiver and configured to:

obtain downlink scheduling information based on a relevant region where the receiving V2X node is located, wherein a cell corresponds to one or more relevant regions, and wherein at least one of the one or more relevant regions is determined by a coordinate range, detect a downlink control channel on time-frequency resources indicated by the downlink scheduling information relevant to the receiving V2X node, obtain target position information corresponding to a position of a transmitting V2X node, which transmitted V2X data information to a base station, from the detected downlink control channel;

determine whether to receive the V2X data information, from the base station to the V2X node on a downlink data channel indicated by the detected downlink control channel based on a position of the receiving V2X node and obtained target position information corresponding to the position of the transmitting V2X node; and receive the V2X data information on the downlink data channel based on an indication of the detected downlink control channel, and the determination to receive the V2X data information.

15. The apparatus of claim 14, wherein the at least one processor is further configured to:

obtain position coordinates of the receiving V2X node, and configure the position coordinates as position information of the receiving V2X node;

or, obtain position coordinates of the receiving V2X node, and determine the coordinate range that the position coordinates belong to based on a coordinate range of each of the one or more relevant regions, and configure a region ID of the relevant region corresponding to the coordinate range as the position information of the receiving V2X node, transmit V2X data information including the position information of the receiving V2X node to the base station, wherein the coordinate range and the region ID are obtained via broadcast of the base station, and wherein the relevant region where the receiving V2X node is located is determined by the base station based on the position information included in the V2X data information on the downlink data channel.

* * * * *